Patented Apr. 16, 1946

2,398,526

UNITED STATES PATENT OFFICE 2,398,526

ISOLATION OF PARA-XYLENE

Richard B. Greenburg, Melrose Park, Pa., assignor to Allied Chemical & Dye Corporation, New York, N. Y., a corporation of New York No Drawing. Application August 7, 1943, Serial No. 497,871

9 Claims. (Cl. 260—674)

This invention relates to the separation of paraxylene from mixtures thereof with other xylenes.

Xylenes are obtained commercially from various natural sources such as coke-oven distillate and drip oil (the oil which accumulates in gas mains). A xylene oil thus obtained ordinarily contains all three xylenes. A reasonably effective separation of ortho-xylene from this mixture may be made by fractionation of the xylene mixture. Meta- and paraxylenes, however, are so close in boiling points that fractionation is ineffective to bring about separation.

It has been proposed to bring about separation of meta- and paraxylenes by a method involving the selective sulfonation of the metaxylene content of the mixture, separation of the sulfonated metaxylene from the unsulfonated oil containing primarily paraxylene, sulfonation of the paraxylene-containing oil, addition of hydrochloric acid to the latter sulfonation product to precipitate paraxylene sulfonic acid, washing of the precipitate with hydrochloric acid, and hydrolysis of the resulting paraxylene sulfonic acid. Methods of this type described in the published prior art, however, are unsatisfactory because they require a very lengthy sulfonation process, the sulfonation is not sufficiently selective, the use of hydrochloric acid introduces a relatively expensive reagent and aggravates corrosion conditions, the yields are low and purity of product is very poor.

It has also been proposed to separate paraxylene, which has the highest melting point of the xylenes, from a xylene mixture by fractional crystallization thereof. It has been found, however, that fractional crystallization produces a product that contains metaxylene admixed with paraxylene, and to prepare pure paraxylene by such a method requires repeated crystallizations. The process is accordingly unsatisfactory and expensive because of the number of low-temperature crystallization operations involved. I have found no commercially practicable and economically attractive method suggested in the published prior art for separation of 100% pure paraxylene.

It is an object of this invention to provide a practicable process for separating pure paraxylene in good yield from a mixture of xylenes.

I have discovered that pure paraxylene may be readily separated in good yield from a mixture of xylenes that contains more than 16% paraxylene by adding methanol or ethanol to the xylene mixture, cooling the resulting xylene-alcohol solution sufficiently to solidify at least part of the xylene mixture, thereafter fractionally melting the solid hydrocarbon mixture and, at a plurality of temperatures during this fractional melting, removing liquid phase material formed by the fractional melting while a part of the hydrocarbon mixture remains in the solid state. The fractional melting and removal of liquid phase are advantageously carried out successively in a plurality of alternate operations.

The combined steps of solidifying or partially solidifying the xylene mixture in the presence of methanol or ethanol and fractional melting of the solid thus formed in a plurality of stages with removal of melted material resulting from each fractional melting operation, I have found, surprisingly makes it possible to withdraw as a product from the melting of the final portion of solid a material that consists of substantially 100% pure paraxylene. The mechanism of this process is not fully understood, but the use of methanol or ethanol rather than any other diluent during cooling of the mixture to produce a solid phase appears to be an important factor in forming a solid of such characteristics that 100% pure paraxylene can be withdrawn as the final fraction upon fractional melting of the solid material.

The process of my invention may be applied to any industrial xylene mixture that contains more than 16% paraxylene, preferably at least about 20% paraxylene, the remainder being predominantly metaxylene; for example, the xylene fraction of coke-oven distillates, drip oil, water-gas-tar and oil-gas-tar oils, similar light oils containing aromatic hydrocarbons, the aromatic fraction of petroleum hydrocarbons, and other sources of aromatic hydrocarbons of the benzene series. Such a paraxylene source material will generally contain, in addition to the paraxylene, metaxylene and other close-boiling hydrocarbons, i. e., hydrocarbons having boiling points close to those of para- and metaxylenes. Examples of such other hydrocarbons include orthoxylene, ethylbenzene, and paraffin hydrocarbons of about the same boiling point as paraxylene. A xylene oil which contains all three xylenes may, if desired, first be fractionated to obtain a fraction somewhat enriched in paraxylene; the process of my invention, however, is applicable to any xylene mixture containing more than 16%, preferably at least about 20%, of paraxylene, the remainder being predominantly metaxylene. I have found it advantageous to employ in the process of my invention the commercially available xylene that consists chiefly of meta- and paraxylenes, the proportion of metaxylene predominating over paraxylene but the latter being present in amount over 16%. For example, nitration xylene, a refined meta- and paraxylene mixture boiling from about 138° to 140° C., low in paraffin hydrocarbons, is a commercially available xylene mixture that may be advantageously treated by the process of my invention.

Since the process of my invention produces a 100% pure paraxylene, it may also be advantageously applied to preparing 100% paraxylene from the paraxylene generally of 90% to 98% purity, produced by sulfonation methods of separating meta- and paraxylenes. However, my process is generally applied to a xylene oil containing less than these proportions of paraxylene.

In practicing my invention a mixture of xylenes and other close-boiling hydrocarbons containing more than 16% paraxylene, for example the readily available nitration xylene containing about 20% paraxylene, about 50% metaxylene, about 20% orthoxylene and a few percent of other hydrocarbons such as paraffins and ethylbenzene, is admixed with ethanol or methanol. The amount of alcohol may range from about 20% to 80% by volume, based on the hydrocarbon, the amount employed being dependent upon the amount of paraxylene present and the amount and purity of the product desired; I have found that equal proportions of alcohol and hydrocarbon by volume are generally advantageous.

The alcohol-xylene mixture is then cooled, preferably to a temperature of between −65° and −70° C., at which temperature substantially all or the greater part of the paraxylene, admixed with other hydrocarbons, has solidified, and the alcohol is largely in the liquid phase. Alternatively, the mixture may be sufficiently cooled to solidify substantially all components, and may then be warmed slowly so as to bring it to equilibrium at a point where the alcohol is largely in the liquid phase and paraxylene is largely in the solid phase.

The mixture is then subjected to filtration, e. g., by means of an internal filter inserted in the mass or by means of a refrigerated centrifuge, to remove the liquid phase as completely as practicable. This first liquid removed from the mixture, referred to herein, as "mother liquor," generally is made up of alcohol containing dissolved hydrocarbons consisting substantially entirely of metaxylene and other hydrocarbons other than paraxylene.

After removal of the mother liquor, the residual solid is warmed up in a plurality of stages, and melted material resulting from each increase in temperature is removed. Up to about 0° C. the material is advantageously melted in stages representing a rise in temperature of about 20° to 40° C. each; above 0° C. the material may advantageously be melted in stages corresponding to smaller temperature rises, e. g. 5° to 10° each, until all the solid has been melted. As above stated, at the end of each warming stage the mixture is treated to separate as much of the liquid phase as is practicable, for example by use of an inside filter (e. g., in the form of a battery of filter leaves) immersed in the mass or by whirling in a refrigerated centrifuge. Alternatively, the solidified hydrocarbon mixture may be subjected to simultaneous warming and filtration; liquid phase material formed by the fractional melting is thus still removed at a plurality of temperature during the fractional melting.

When the solidified xylene-alcohol mixture is melted and liquid phase material drawn off as above described, I have found that a 100% pure paraxylene product is recovered from the material melting above about 10° C. The cuts taken just under 10° C., for example material melting from about −20° to +10° C., I have found, are generally high in paraxylene and may be useful for many purposes where paraxylene of somewhat less than 100% purity can be employed. This material may also be reworked with a new charge to obtain an additional yield of 100% paraxylene.

The following examples are illustrative of the process of the invention:

EXAMPLE 1

50 parts by volume of a nitration grade xylene containing about 20% paraxylene, about 50% metaxylene, about 25% orthoxylene, and about 5% of other hydrocarbons, chiefly paraffins, were mixed with 50 parts by volume of methanol and the mixture was placed in a refrigerated vessel. An internal filtering unit was immersed in the mixture. This unit was designed so that upon application of vacuum liquid would be drawn from the material in which the unit was immersed through a filter medium into an internal chamber of the filter unit from whence liquid could be withdrawn through a conduit. After immersing a filter unit in the xylene-alcohol mixture the internal chamber of the filter unit was placed under a slight air pressure so as to prevent liquid from seeping into the passages of the filter medium and freezing there when the xylene-alcohol mixture was later cooled. The mixture was cooled to about −71° C. and was held at this temperature until equilibrium had been attained. At this point, three-quarters to four-fifths of the xylene-alcohol mixture still remained liquid. Vacuum was then applied to the filter unit and 77 volume parts of liquid, largely the methanol diluent, were drawn off. The temperature of the residual mixture was permitted to rise and the liquid phase which formed by melting of the solid was drawn off from time to time as completely as possible. In this way, four additional fractions of material were taken off as liquid through the filter by the time the temperature had risen to 17° C. and all solid material had melted.

The data on these cuts are as follows:

Table 1

| Cut No. | Temperature at which removed | Volume percent of charge taken as cut | Volume per cent paraxylene in cut |
|---|---|---|---|
| | °C. | | |
| Mother liquor | −71 | 77 | |
| 1 | −71 to −30 | 3.8 | 34.5 |
| 2 | −30 to −10 | 4.4 | 47.0 |
| 3 | −10 to +10 | 3.0 | 74.5 |
| 4 | +10 to +17 | 3.1 | 100.0 |

EXAMPLE 2

50 parts by volume of the same xylene mixture as in Example 1 were mixed with 50 parts by volume of ethanol. This mixture was treated as described in Example 1 except that it was initially cooled to −68° rather than −71° C. and the temperature of the mixture was permitted to rise to −64.5° C. while the mother liquor was being taken off.

The data on this run are as follows:

Table 2

| Cut No. | Temperature at which removed | Volume percent of charge taken as cut | Volume per cent paraxylene in cut |
|---|---|---|---|
| | °C. | | |
| Mother liquor | −68 to −64.5 | 76.0 | |
| 1 | −64.5 to −20 | 3.6 | 40 |
| 2 | −20 to 0 | 5.8 | 66 |
| 3 | 0 to +10 | 2.4 | 88 |
| 4 | +10 to +17 | 1.8 | 100 |

The expression "alkanol of not more than 2 carbon atoms" is used in the claims to denote either methanol or ethanol.

Since certain changes may be made in carrying out the above process without departing from the scope of the invention, it is intended that all matter contained in the above description shall be interpreted as illustrative and not in a limiting sense.

I claim:

1. In a process for separating pure paraxylene from a hydrocarbon oil containing more than 16% paraxylene and other close-boiling hydrocarbons, the steps that comprise cooling a mixture of said hydrocarbon oil and an alkanol of not more than 2 carbon atoms to solidify at least a part of the hydrocarbon mixture, thereafter fractionally melting the solid hydrocarbon mixture and, at a plurality of temperatures during said fractional melting, removing liquid phase material formed by the fractional melting.

2. In a process for separating pure paraxylene from a mixed xylene oil containing more than 16% paraxylene, the remainder consisting predominantly of metaxylene, the steps that comprise cooling a mixture of said oil and an alkanol of not more than 2 carbon atoms to solidify at least a part of the hydrocarbon mixture, thereafter fractionally melting the solid hydrocarbon mixture and, at a plurality of temperatures during said fractional melting, removing liquid phase material formed by the fractional melting while a part of the hydrocarbon mixture remains in the solid state.

3. In a process for separating pure paraxylene from a mixed xylene oil containing more than 16% paraxylene, the remainder consisting predominantly of metaxylene, the steps that comprise cooling a mixture of said oil and an alkanol of not more than 2 carbon atoms to solidify at least a part of the hydrocarbon mixture, and thereafter, in a plurality of stages of alternate operations, successively removing liquid phase and melting a part of the solid to form additional liquid phase until the mixture reaches a temperature of about +10° C., removing melted material resulting from each increase in temperature up to a temperature of about +10° C., and withdrawing as substantially pure paraxylene product the material melting above +10° C.

4. In a process for separating pure paraxylene from a mixed xylene oil containing more than 16% paraxylene, the remainder consisting predominantly of metaxylene, the steps that comprise cooling a mixture of said oil and ethyl alcohol to solidify at least a part of the hydrocarbon mixture, and thereafter, in a plurality of stages of alternate operations, successively removing liquid phase and melting a part of the solid to form additional liquid phase, whereby substantially pure paraxylene is withdrawn as the final melting fraction.

5. In a process for separating pure paraxylene from a mixed xylene oil containing more than 16% paraxylene, the remainder consisting predominantly of metaxylene, the steps that comprise cooling a mixture of said oil and methyl alcohol to solidify at least a part of the hydrocarbon mixture, and thereafter, in a plurality of stages of alternate operations, successively removing liquid phase and melting a part of the solid to form additional liquid phase, whereby substantially pure paraxylene is withdrawn as the final melting fraction.

6. In a process for separating pure paraxylene from a mixed xylene oil containing at least about 20% paraxylene, the remainder consisting predominantly of metaxylene, the steps that comprise cooling a mixture of said oil and from about 20% to about 80% by volume, based on the oil, of an alkanol of not more than 2 carbon atoms, to solidify at least a part of the hydrocarbon mixture, thereafter allowing the temperature of the mixture to rise in a series of steps, removing melted material resulting from each increase in temperature up to a temperature of about +10° C., and withdrawing as substantially pure paraxylene product the material melting above +10° C.

7. In a process for separating substantially pure paraxylene from a mixture of xylenes containing more than 16% paraxylene, the remainder consisting predominantly of metaxylene, the steps that comprise diluting the xylene mixture with an alkanol of not more than 2 carbon atoms, bringing the resulting xylene-alcohol solution to a temperature at which a solid phase comprising at least a part of the xylene mixture is in substantial equilibrium with a liquid phase, removing at least a part of said liquid phase, thereafter raising the temperature of the residual mixture in a plurality of steps to melt solid and form additional liquid phase, removing melted material resulting from each increase in temperature, and continuing these alternate operations until the residual material consists of substantially pure paraxylene.

8. In a process for separating substantially pure paraxylene from a mixture of xylenes containing more than 16% paraxylene, the remainder consisting predominantly of metaxylene, the steps that comprise diluting the xylene mixture with an alkanol of not more than 2 carbon atoms employed in amount ranging from about 20% to 80% by volume based on the xylene mixture, bringing the resulting xylene-alcohol solution to a temperature at which a solid phase comprising at least a part of the xylene mixture is in substantial equilibrium with a liquid phase, removing at least a part of said liquid phase, thereafter raising the temperature of the residual mixture in a series of steps to melt solid and form additional liquid phase, removing melted material resulting from each increase in temperature, and continuing these alternate operations until the residual material consists of substantially pure paraxylene.

9. In a process for separating substantially pure paraxylene from a mixture of xylenes containing at least about 20% paraxylene, the remainder consisting predominantly of metaxylene, the steps comprising diluting the xylene mixture with an alkanol of not more than 2 carbon atoms employed in an amount about equal in volume to the hydrocarbon oil, bringing the resulting xylene-alcohol solution to a temperature below about −65° C. at which a solid hydrocarbon phase is in substantial equilibrium with a liquid phase, removing the greater part of said liquid phase, thereafter raising the temperature of the residual mixture in a series of stages, each stage involving a temperature increase of not more than 40° C., to melt solid and form additional liquid phase, removing melted material resulting from each increase in temperature up to a temperature of about +10° C., and withdrawing as substantially pure paraxylene product the material melting above +10° C.

RICHARD B. GREENBURG.